United States Patent [19]

Gagnon

[11] Patent Number: 4,464,019

[45] Date of Patent: Aug. 7, 1984

[54] TWO-COLOR LIQUID CRYSTAL LIGHT VALVE IMAGE PROJECTION SYSTEM WITH COLOR SELECTIVE PREPOLARIZERS IN SINGLE OPTICAL TANK

[75] Inventor: Ralph J. Gagnon, Chico, Calif.

[73] Assignee: Hughes Aircraft Company, El Segundo, Calif.

[21] Appl. No.: 334,678

[22] Filed: Dec. 28, 1981

[51] Int. Cl.³ .............................................. G02F 1/13
[52] U.S. Cl. .................................. 350/331 R; 353/31
[58] Field of Search ................... 350/331 R, 342, 345, 350/337, 401, 402, 403, 408; 353/31, 34, 37; 358/60, 61

[56] References Cited

U.S. PATENT DOCUMENTS

| | | | |
|---|---|---|---|
| 4,019,807 | 4/1977 | Boswel et al. | 350/342 |
| 4,191,456 | 3/1980 | Hong et al. | 350/342 X |
| 4,345,258 | 8/1982 | Tsai et al. | 353/31 X |

OTHER PUBLICATIONS

Hong et al., II, "Application of the Liquid Crystal Light Valve to a Large Screen Graphics Display", SID, May 8, 1979.

*Primary Examiner*—John K. Corbin
*Assistant Examiner*—David Lewis
*Attorney, Agent, or Firm*—William J. Benman, Jr.; William J. Bethurum; Anthony W. Karambelas

[57] ABSTRACT

This invention provides a unitary oil coupled optical arrangement for color selective prepolarization of the light incident upon two light valves. The optical arrangement is immersed within a single tank. It includes dichroic filters which act on polarized light from a light source which has been polarized into two beams by passing through and being reflected from a prepolarizing optical thin film stack. The first dichroic filter provides light of a first color and a first polarization while the second dichroic filter provides light of a second color and a second polarization. The light from each of the filters is then combined into a single beam by a thin film polarization-selective beam combiner prior to being applied to the main polarizing prism. The main prism then passes light of a first polarization and a first color to a first light valve and light of the second polarization and a second color to the second light valve in a conventional manner. Each light valve operates on the light in accordance with the presence of the writing light input from a cathode ray tube. The output of each light valve and is then applied to projection lens by the main polarizing prism.

8 Claims, 4 Drawing Figures

TWO-COLOR LIQUID CRYSTAL LIGHT VALVE IMAGE PROJECTION SYSTEM WITH COLOR SELECTIVE PREPOLARIZERS IN SINGLE OPTICAL TANK

BACKGROUND OF THE INVENTION

1. Field of the Invention

This invention relates to liquid crystal light valve projectors. Specifically, this invention relates to two color liquid crystal light valve projectors with oil coupled dichroics and prepolarizers.

While the present invention will be described herein in with reference to particular applications, it is to be understood that the invention is not limited thereto. Those having ordinary skill in the art and access to the teachings of this invention will recognize additional applications within the scope thereof.

2. Description of the Prior Art

The development of the liquid crystal light valve has opened the door to substantial progress in the state of the art of high quality large screen projectors. The reflective mode liquid crystal light valve is a thin film, multilayer structure comprising a liquid crystal layer, a dielectric mirror, a light blocking layer, and a photoresponsive layer sandwiched between two transparent electrodes. A polarized projection beam is directed through the liquid crystal layer to the dielectric mirror. An input image of low intensity light, such as that generated by a cathode ray tube, is applied to the photoresponsive layer thereby switching the electric field across the electrodes from the photoresponsive layer onto the liquid crystal layer to activate the liquid crystal. Linearly polarized projection light passing through the liquid crystal layer and reflecting from the dielectric mirror is polarization-modulated in accordance with the information incident on the photoconductor. Therefore, if a complex distribution of light, for example a high resolution input image, is focused onto the photoconductor surface, the device converts the image into a replica which can be projected with magnification to produce a high brightness image on a viewing screen. U.S. Pat. No. 4,019,807 issued to D. D. Boswell et al on Apr. 26, 1977 discloses such a high performance reflective mode liquid crystal light valve.

A graphics display projector using a liquid crystal light valve of the above-type is described in an article entitled "Application of the Liquid Crystal Light Valve to a Large Screen Graphics Display", published in the 1979 Society for Information Display (SID), International Symposium, Digest of Technical Papers, May 1979, pp. 22-23. This display system, a type with which the present invention is particularly but not exclusively concerned, projects a large scale image having yellow-white characters on a dark blue background. The system includes a cathode ray tube (CRT) which provides input imagery; projection optics which provide the bright collimated output beam and necessary light polarization; and the liquid crystal light valve which interfaces the input and output functions.

The system uses a powerful light source such as a xenon arc lamp to illuminate the liquid crystal light valve through collimating and polarizing optics. Light emitted from the xenon arc lamp is transmitted to a main polarizing prism where it is separated into 'S' and 'P' components. The 'P' component passes through the prism while the 'S' component is reflected toward the light valve. Information displayed by cathode ray tube is transferred by fiber optics to one side of the light valve which changes the polarization state from 'S' to 'P'. The light is then transmitted through the prism and imaged on a screen by projection lens. In this capacity, the main prism functions as an analyzer, converting modulations of polarization to modulations of brightness or intensity.

The quality of the projected image is generally a function of brightness, resolution and contrast. Image quality can generally be improved by placing a prepolarizing prism in the optical path in front of the main polarizing prism. The prepolarizing prism is somewhat effective in overcoming the deficiencies in the main polarizing prism. That is, since the main polarizing prism is not 100% effective in transmitting light of one polarization and reflecting light of another, light of an undesirable polarization may reach the light valve and be modulated and reflected back through the main prism onto the projection lens. This often results in distortions of color and/or reductions in contrast and resolution.

Since the prepolarizing prism, for reasons of cost, may be of the same design as the main prism, it would typically have similar reflectance and transmittance characteristics. However, when the two prisms are used in combination, the additive effect is such as to greatly improve the quality of the projected image. The prepolarizing prism substantially removes light of one polarization from the light which illuminates the main prism. The main prism then acts on the beam again to substantially remove the residual light of the undesirable polarization.

However, in some applications it is desirable to use a second liquid crystal light valve for enhanced information displaying capability and versatility. In this application, the use of the prepolarizing prism becomes problematic insofar as the second light valve would require light of the polarization that would otherwise be removed by the prepolarizing prism. As a result, the use of a second light valve has forced a compromise in the quality of the projected image.

This problem was addressed by the Applicant and Roy Cedarstrom in a copending application entitled "Two-Color Liquid Crystal Light Valve Projection System with Single Prepolarizer". It provides a color selective prepolarization of the light incident upon two or more light valves. This is accomplished by use of a prepolarizing prism which acts on light from a light source to direct light of a first polarization to a first dichroic separator and light of a second polarization to a second dichroic separator. The resulting beams are recombined in a dichroic adder prior to being applied to a second polarizing prism. The second polarizing prism directs light of a first color and polarization to a first light valve and light of a second polarization to a second light valve in the conventional manner.

This system, though effective, is bulky insofar as each prism is essentially either a small tank with a optical thin film layer immersed in oil or a glass cube. The system of the copending application requires air coupling to oil or glass immersed beam splitters. The resulting arrangement requires much attention to the proper alignment of the components. This adds significantly to its cost.

SUMMARY OF THE INVENTION

The present invention provides a two-channel color selective prepolarization in oil with oil coupled dichroics.

The invention includes a prepolarizing beam splitter for splitting and prepolarizing light from a source into first and second beams having first and second polarization states respectively. Two dichroic separators are provided. The first separator extracts light of a first color from the first beam and the second separator extracts light of a second color from the second beam. The resultant output of each separator is a collimated polarized monochromatic beam. The separator outputs are recombined by a beam combiner into a single beam which is directed to a second polarizing beam splitter. The second beam splitter splits the single beam and reflects light of the first color and polarization through a first trim filer to a first light valve and light of the second color and polarization through a second trim filter to a second light valve. The exiting light is polarization modulated by the liquid crystal light valves in a conventional manner and returned to the second polarizing beam splitter for subsequent recombination and transmission to externally mounted projection optics. This system thus provides two-channel prepolarization by way of an oil coupled optical arrangement.

DESCRIPTION OF THE INVENTION

Figure 1:
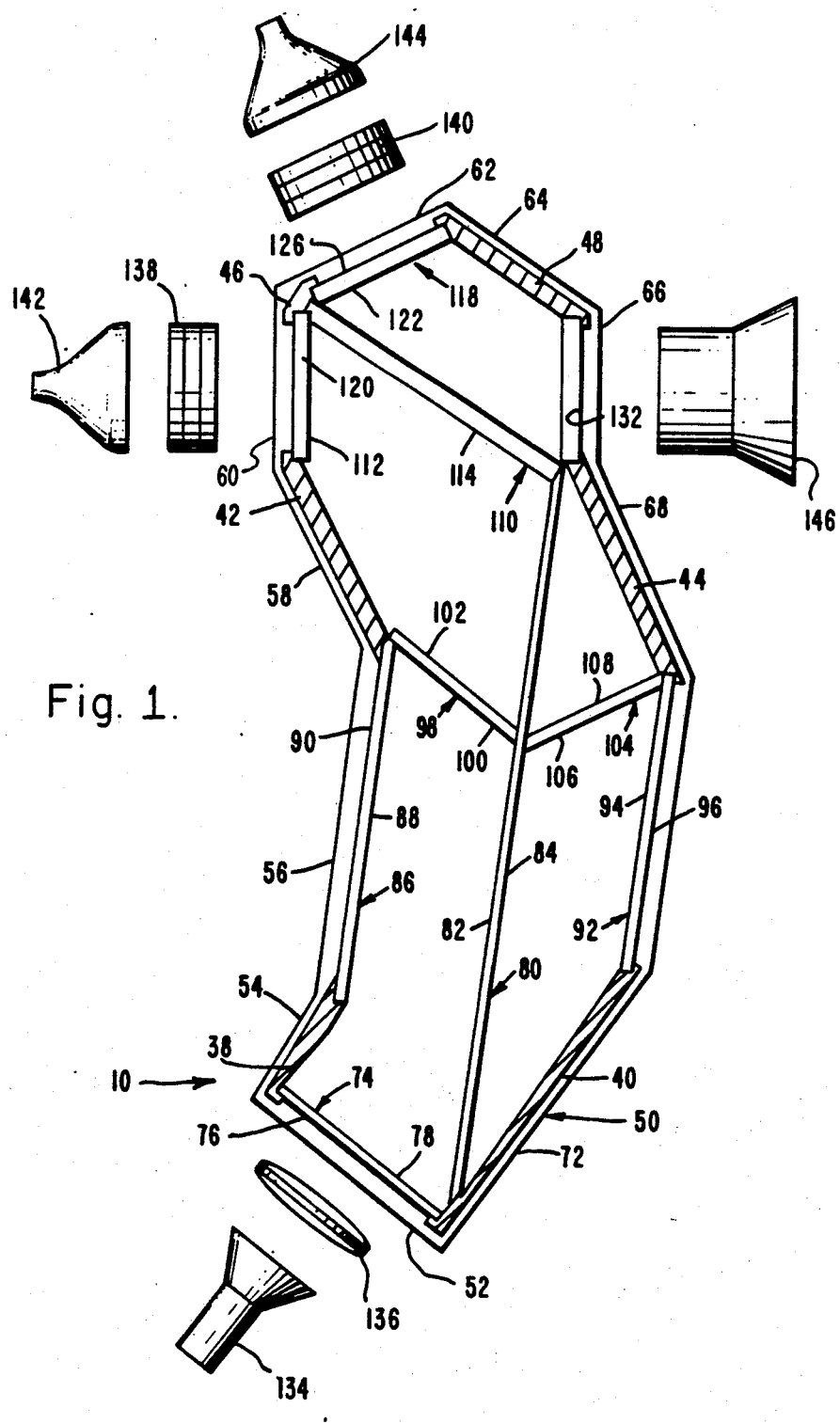
FIG. 1 is a diagramatic representation of a preferred embodiment of the present invention.
Figure 2:
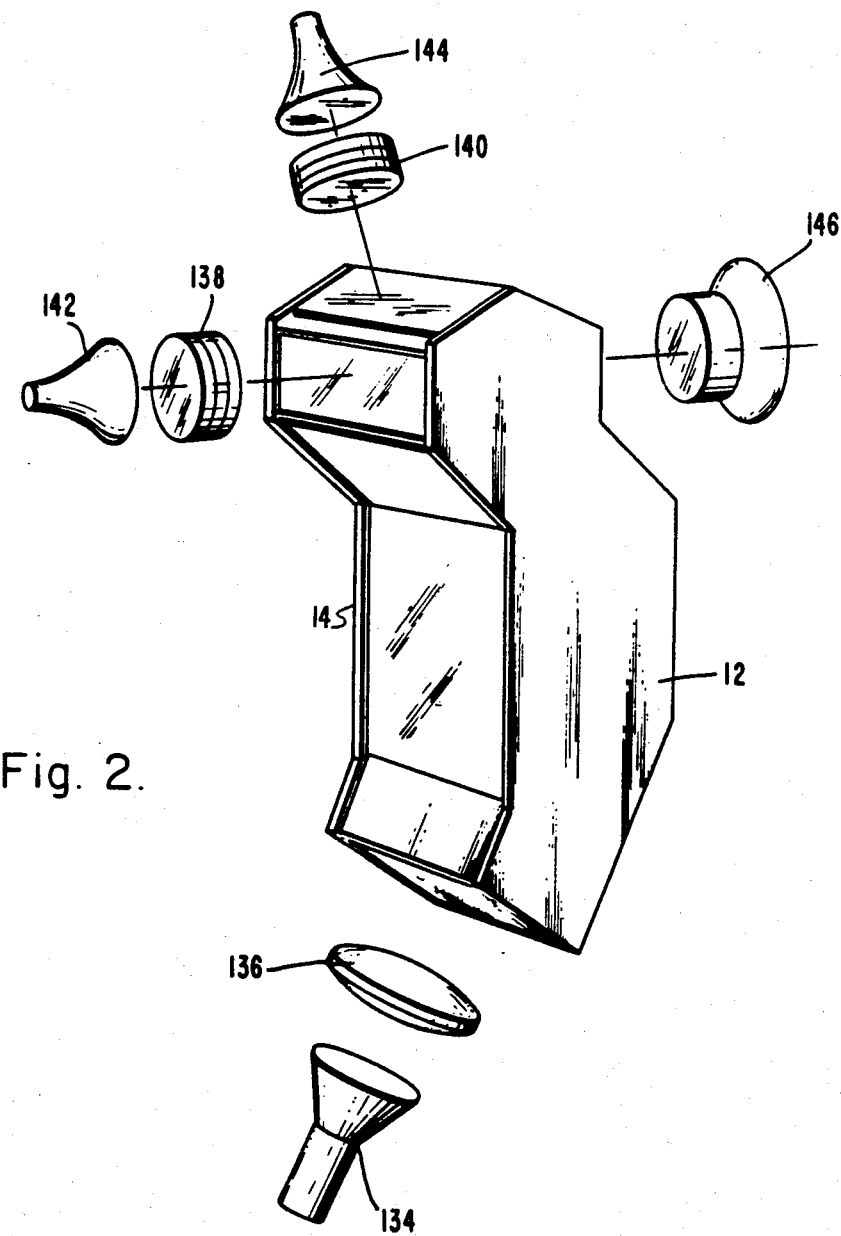
FIG. 2 is a perspective view of the preferred embodiment of the present invention.
Figure 3:
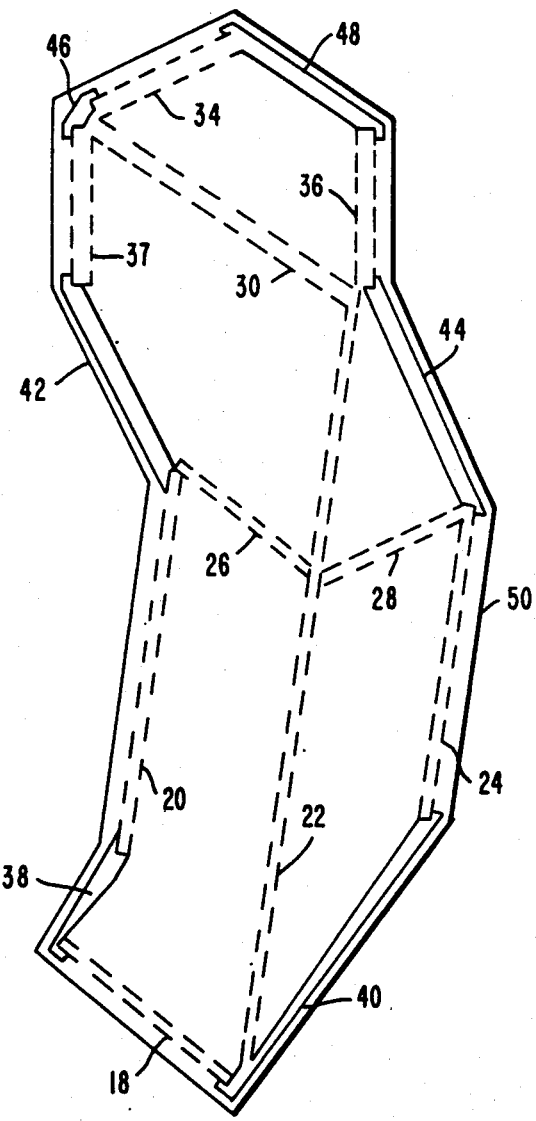
FIG. 3 is a top plan view of the bottom plate of the present invention.

The invention 10 as shown in the top view of FIG. 1 and the perspective view of FIG. 2 includes a top plate 12 and a bottom plate 14. As shown in FIG. 3, the top and bottom plates 12 and 14 are mirrored images. Each has milled grooves 18-36, even numbers only, which hold various glass elements in place. The plates 12 and 14 also include posts 38-48 which effectively seal the spaces between the glass components seated in the milled grooves. Since the top plate is the mirror image of the bottom plate, the grooves and posts are in alignment. The plates 14 and 16 may be constructed of glass, plastic, metal or any other suitably rigid material. As shown in FIG. 3, each plate has an irregular polygonal shape. As discussed more fully below, this shape is required by the critical juxtapositioning of the optical components.

The exterior wall 50 of the container 10 may be glass, plastic or other suitably transparent material. The exterior wall 50 may be a nontransparent material so long as the input and output apertures of the container 10 are suitably transparent. The exterior wall 50 includes a plurality of planar surfaces 52-72. It should be noted that the external shape of the container 10 is not critical so long as the internal components are properly aligned. As mentioned above, the posts and grooves function to maintain the alignment of the components. Note that other techniques for insuring the proper alignment of the components may be employed without departing from the scope of the invention.

An optical filter 74 is mounted in groove 18 between posts 38 and 40. The filter 74 is made of glass, plastic or other suitably transparent material such as the Schott GG 495 sharp-cut yellow filter. The filter 74 has a high efficiency anti-reflection coating on the input surface 76 which filters ultra-violet light. No coating is required on the opposite surface 78. In the preferred embodiment, the dimensions of the filter are 2.8"×2.8"×⅛" respectively. The filter 74 is mounted in a plane substantially parallel to the exterior surface 50 of the container 10.

A prepolarizing beam splitter 80 is mounted in groove 22 between posts 40 and 44. The prepolarizing beam splitter 80 is constructed of optical grade fused silica having an index of refraction of 1.46 and a birefringence less than or equal to 10 nm/cm. In the preferred embodiment, the dimensions of the plate are 10 1/16"×2.8"×⅛". The plate may be divided in half providing two 5 1/32" segments if there is a cost savings. On the input surface 82, the plate 80 has a thin film coating consisting of six sets of layers, each set having a first layer of depth ¼ wavelengths ($\lambda$) and index of refraction (n) of 1.46 and a second layer of depth ¼ wavelengths and index n=2.35. This construction is at an optical wavelength nanometers (nm). The index of refraction of the oil medium is n=1.46. In this illustrative embodiment, it was found that an orientation of 57.5° or 58° relative to normal incidence provides the best contrast for the prepolarizing beam splitter 80, which comes at the expense of a larger size than is possible with smaller incidence angles.

A mirror 86 is mounted in groove 20 between posts 38 and 42. The mirror 86 is of conventional construction with a birefringence less than or equal to 12 nm/cm. The mirror dimensions are 5"×2.8"×⅛". The surface 88 of the mirror 86 must be mirrored. The surface 90 of the mirror 86 may be blackened.

A second mirror 92 is mounted in the groove 24 between posts 40 and 44. Th construction of the second mirror 92 is identical to that of the mirror 86 with the exception that its dimensions which are 4⅛"×2.8"×⅛".

The interior surface 94 of the mirror 92 must be reflective while the exterior surface 96 of the mirror 92 may be blackened.

A red dichroic filter 104 is mounted in groove 28 between post 44 and prepolarizing beam splitter 80. The red filter 104 is optical grade of fused silica n=1.46 with a birefringence less than or equal to 10 nm/cm. The green dichroic filter 98 has dimensions of 2"×2.8"×⅛".

It has a coating on the forward surface 106 that is effective to transmit green light and reflect light of other colors. The coating includes 13 sets of thin film layers. Each set having a first layer of optical thickness equal to one-half of one quarter wavelength and index of refraction (n) equal to 1.46, a second layer of thickness equal to one quarter wavelength and n×2.32 and a third layer one half of one quarter wavelength in depth and n=1.46. These sets of layers are sandwiched between two additional layers of depth 1.228 quarter wavelengths at n=2.32. This construction is at optical thickness $\lambda$=496 nm.

A green dichroic filter 98 is mounted in groove 26 between post 42 and the prepolarizing beam splitter 80. The green filter 98 is of the same construction as the red filter 104 with the exception that is dimensions are 2×2.8"×⅛". Surface 100 is coated with 13 sets of thin film layers sandwiched between two additional layers which is then sandwiched between two final layers. The 13 sets of layers is such that each set includes a first layer of depth is 0.125λ and index n=1.46, a second layer of depth 0.25λ and index n=2.32 and a third layer of depth 0.125λ and index n=1.46. These 13 sets of layers are sandwiched between two additional layers, each of which has a depth of 0.84 quarter wavelengths and index n=1.46. These 13 sets of layers and two additional layers are then sandwiched between two final layers, each of which has a depth of 0.84 quarter wavelengths and index n=2.32. The construction is at an optical thickness λ=664 nm. Each of the filters 98 and 104 may have edges beveled to provide a close interfit with the prepolarizing beam splitter 80, mirrors 86 and 92 and posts 42 and 44.

The main beam splitter 110 is mounted in groove 30 between posts 44 and 46. Its edges may be beveled or angled to provide a close interfit with the prepolarizing beam splitter 80 and the trim filter or light valve exit window 112 to be discussed more fully below. The main beam splitter 110 is constructed of optical grade isotropic fused silica having an index n=1.46 and birefringence less than or equal to 2 nm/cm. It is mounted relative to the prepolarizing beam splitter 80 so that light will be incident at an angle of 57.5°. It has dimensions of 3⅜"×2.8"×¼". It has a thin film multi-layer coating identical to the prepolarizing beamsplitter 80.

Figure 4:
FIG. 4 is a side elevational view of the light valve exit window of the present invention.

The light valve exit windows or trim filters 112 and 118 are mounted in grooves 32 and 34 respectively between posts 42 and 46 and 46 and 48 respectively. Each is constructed of optical grade fused silica having a birefringence of less than or equal to 3 nm/cm. Each has a height of 2", a width of 2.8", and a depth of 0.14" at the top and 0.25" at the bottom. See FIG. 4. FIG. 4 shows a side view of the light valve exit windows 112 and 118. In the preferred embodiment, surface 120 is coated with the same thin film design as the green dichroic filter 98, and surface 122 is coated with the same thin film design as the red dichroic filter 104 as a cost/performance tradeoff.

The projection lens exit window 132 is mounted in groove 36 between posts 44 and 48. It is constructed of optical grade fused silica of a birefringence of less than or equal to 10 nm/cm. On one surface is a high efficiency antireflection coating between 500-700 nm. The projection lens exit window 132 has dimensions of 2"×2.8"×¼".

FIG. 2 shows the invention 10 in an operational environment. The light source 134 and collimating optics 136 are mounted in optical alignment with the filter 74. Liquid crystal light valves 138 and 140 are mounted parallel with the light valve exit windows 112 and 118 respectively. Cathode ray tubes 142 and 144 are mounted in optical alignment with the liquid crystal light valves 138 and 140 respectively.

In operation, the light source 134 emits unpolarized white light which is collimated by lens 136 and filtered by the UV filter 74. The filtered collimated unpolarized light is incident on prepolarizing beam splitter 80 at an angle of 57.5°. The 'S' polarized light is reflected to mirror 86 and the 'P' polarized light is transmitted through the prepolarizing beam splitter 80 to the mirror 92. The 'S' polarized light is reflected by mirror 86 to the green filter 98. The 'P' polarized light is reflected by mirror 92 to the red filter 104. The green filter 98 transmits green 'S' polarized light to the prepolarizing beam splitter 80. The red filter 104 transmits red 'P' polarized light to the prepolarizing beam splitter 80. The beam splitter recombines the outputs of the filters 98 and 104 onto a single beam which is incident upon the main beam splitter 110 at an angle of 57.5°. The green 'S' polarized light is reflected to the green dichroic trim filter acting as a liquid crystal light valve exit window 112 while the red 'P' polarized light is transmitted to the red dichroic trim filter acting as a second liquid crystal light valve exit window 118. The light exits the windows 112 and 118 and illuminates light valves 138 and 140 respectively. The light valves modulate the polarization of incident light in accordance with the presence of writing light from the cathode ray tubes 142 and 144 in a conventional manner. Accordingly, polarization modulated light is returned to the main prism 110 via windows 112 and 118. The main prism 110 analyzes the polarization modulated light from the light valves and transmits or reflects it depending upon its polarization state to the projection lens exit window 132. The combined beams are directed to projection optics 146 which is in alignment with the projection lens exit window 132. It should be noted that the beamsplitters were designed and evaluated with the aid of the thin film computer program provided as a service by the Genesee Company of Rochester, N.Y.

The present invention has been described with reference to a particular embodiment. It is understood that other designs of the container may be utilized without departing substantially from the scope of the present invention. It is also understood that certain modifications can be made with regard to the selection of polarization components to be filtered by the red and green filters respectively. In addition, other dichroic filters may be utilized without departing from the scope of the invention. Further, the prepolarizing beam splitter need not be a unitary beam splitter but may instead be two separate prepolarizing beam splitters. In addition, the entire assembly need not be immersed in oil, it may be rigidly mounted in a block of fused silica or other suitably transparent material. Finally, the optical elements of this invention may be mounted relative to incident light at angles other than those specified herein, so long as the elements are coated with thin film layers of appropriate thickness and index of refraction as may be necessary to achieve the performance desired. It is anticipated by the appended claims to cover any and all such modifications.

What is claimed is:

1. A unitary optical arrangement comprising:
 a first polarizing beam splitter which splits and prepolarizes light from a source into first and second beams having first and second polarization states, respectively;
 a first dichroic separator which extracts light of a first color from said first beam;
 a second dichroic separator which extracts light of a second color from said second beam;
 a beam combiner which adds the outputs of said first and second separators to form a single beam; and
 a second polarizing beam splitter which directs light of a first color and polarization to a first trim filter and light of a second color and polarization to a second trim filter.

2. A multi-color image projection system comprising:
 a light source for providing light energy;
 a unitary optical arrangement including a prepolarizing beam splitter which splits and prepolarizes light from the source into first and second beams having first and second polarization states respectively, a first dichroic separator which extracts light of a first color from said first beam, a second dichroic separator which extracts light of a second color from said second beam, a beam combiner which adds the output of the first separator to that of the second separator to form a single beam, and a second polarizing beam splitter which splits the single beam and reflecting light of the first color and polarization and transmitting light of the second color and polarization;

a first light valve which selectively modulates the polarization state of light reflected by said second polarizing beam splitter from the first polarization state to the second polarization state;

a second light valve which selectively modulates the polarization state of the light transmitted by said second polarizing beam splitter from the second polarization state to the first polarization state;

first and second trim filters mounted between said second polarizing beam splitter and said first and second light valves; and projection means for projecting light modulated by said first and second light valves.

3. The unitary optical arrangement or claim 1 wherein said first and second polarizing beam splitters, said first and second separators and said beam combiner are coupled through oil.

4. The multi-color image projection system of claim 2 wherein said first and second light valves are liquid crystal light valves and said system includes first and second cathode ray tubes which provides an input image for said first and second liquid crystal light valves, respectively.

5. In an optical system including means for providing light energy, first and second light valves, first and second cathode ray tubes for use with said first and second light valves, respectively, and projection optics; an improved optical arrangement comprising:

a container, having a plurality of surfaces which are joined together to form a chamber, suitable for holding fluid, including a first surface for providing an input aperture, second and third surfaces each providing an output aperture for polarized light and an input aperture for modulated light, and a fourth surface providing an output aperture;

a prepolarizing beam splitter which splits and prepolarizes light from a source into first and second beams having first and second polarization states, respectively;

a first dichroic separator which extracts light of a first color from said first beam and a second dichroic separator for extracting light of a second color from said second beam;

a beam combiner which adds the output of the first separator to the output of the second separator to form a single beam;

first and second trim filters mounted at said second and third apertures respectively; and a main polarizing beam splitter which directs light of a first color and polarization through the first trim filter to a first light valve and light of a second color and polarization through the second trim filter to a second light valve and directing intensity modulated light through said fourth aperture.

6. The optical system of claim 5 including mirrors which directs said first and second beams to said first and second separators respectively.

7. The multi-color image projection system of claim 2 wherein said first and second polarizing beam splitters, said first and second separators and said beam combiner are coupled through oil.

8. The optical system of claim 5 wherein said first and second light valves are liquid crystal light valves and said system includes first and second cathode ray tubes which provides an input image for said first and second liquid crystal light valves, respectively.

* * * * *